United States Patent

[11] 3,614,545

[72] Inventor Robert Roese
Los Angeles, Calif.
[21] Appl. No. 27,639
[22] Filed Apr. 13, 1970
[45] Patented Oct. 19, 1971
[73] Assignee The Bissett-Berman Corporation
Santa Monica, Calif.

[54] ELECTROLYTIC CELL HAVING IMPROVED CONSTRUCTION
8 Claims, 1 Drawing Fig.

[52] U.S. Cl. ................................................ 317/230, 317/231
[51] Int. Cl. .................................................. H01g 9/08
[50] Field of Search ..................................... 317/230, 231, 232, 233

[56] References Cited
UNITED STATES PATENTS

| | | | |
|---|---|---|---|
| 2,871,426 | 1/1959 | Hilton et al. | 317/230 |
| 3,141,118 | 7/1964 | Runtz | 317/230 |
| 3,156,853 | 11/1964 | West | 317/230 |
| 3,245,888 | 4/1966 | West et al. | 317/230 |
| 3,336,513 | 8/1967 | Le Roy | 317/230 |
| 3,423,648 | 1/1969 | Mintz | 317/231 |
| 3,248,613 | 4/1966 | Griffin et al. | 317/230 |

Primary Examiner—James D. Kallam
Attorney—Smyth, Roston & Pavitt

ABSTRACT: An electrolytic cell comprising a first electrode and a second electrode. The first electrode is formed as a container having an open end, a closed end, and a wall. An electrolytic solution is contained within the container. A plug having a hole therethrough is contained within the container and in contact with the liquid conductive medium. A portion of the second electrode is inserted through the hole in the plug and extends therethrough and into the electrolytic solution and the second electrode includes an enlarged portion which limits the insertion of the second electrode into the electrolytic solution. A sealant fills the open end of the container and surrounds the enlarged portion of the second electrode to lock the second electrode in position.

PATENTED OCT 19 1971
3,614,545
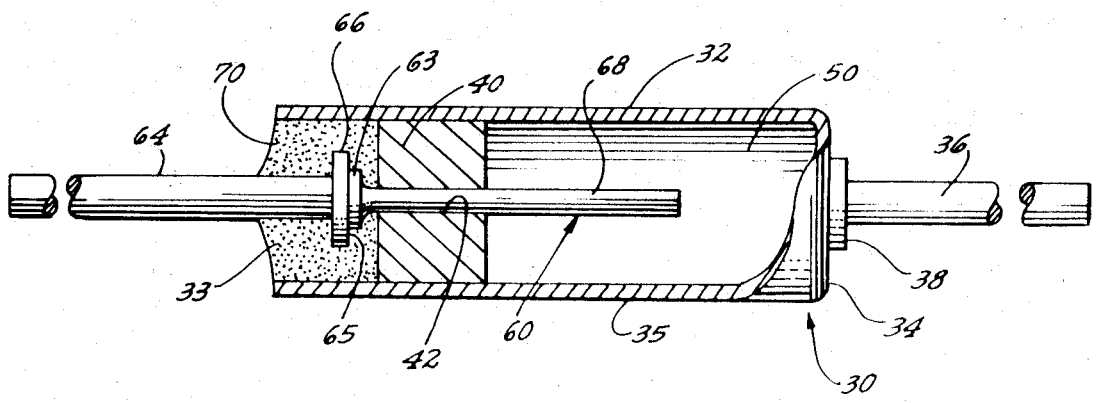
INVENTOR.
Robert Roese
ATTORNEYS

ELECTROLYTIC CELL HAVING IMPROVED CONSTRUCTION

BACKGROUND OF THE INVENTION

1. Field of the Invention

This invention relates in general to an electrolytic cell and more particularly to an improved electrolytic cell having a small size and a simple construction.

2. Description of the Prior Art

An electrolytic cell is a device having at least two electrodes with portions that are in contact with an electrolyte. One of the electrodes includes at least a surface portion of an active material such as silver, and another electrode includes at least a surface portion of an inert material such as gold. THe electrolyte provides a medium wherein the active material can be transferred between the two electrodes. When a current is applied to flow in a first direction from the electrode including the active material to the electrode including the inert material, a portion of the active material is transferred to the inert material electrode. When a current is applied to flow in the opposite direction, the active material is transferred back from the inert material electrode to the active material electrode.

An electrolytic cell may be constructed such that one electrode is formed as a container which contains the electrolyte. For example, the container can be constructed to include at least an inner surface of the active material, such as silver, or the container can be constructed entirely of the active material, such as silver. The container may have the shape of a cylinder having an open end and a closed end. The other electrode or inner electrode may extends into the container from the open end so that at least a portion of the inner electrode is in contact with the electrolyte. The inner electrode may be sealed across the open end of the container by means of a sealant or plug. The inner electrode may include at least an outer surface of an inert material, such as gold, or the inner electrode may be made of solid gold.

Prior art systems that operate on the above-described principle and are constituted similarly are disclosed in U.S. Pat. No. 3,423,643, issued Jan. 21, 1969, in the name of Edward J. Plehal, Gene Frick, and Martin Mintz, and assigned to the Bissett-Berman Corporation, in U.S. Pat. No. 3,423,643, issued Jan. 21, 1969, in the name of Martin Mintz, and assigned to the Bissett-Berman Corporation.

The prior art devices of the type referred to above operate satisfactorily for their purpose and size. The prior art devices are designed to operate at charge densities or current densities above a particular minimum level. However, in some applications it is desired to have an electrolytic cell that operates at charge densities substantially smaller than the prior art devices but still having the capability of operating at relatively high-charge densities. Also, it would be desirable to use electrolytic cells which are smaller in size than the prior art devices. Furthermore, while making a smaller device it is desirable to construct the electrolytic cell at a reasonable manufacturing cost.

One of the electrodes in the prior art devices generally includes an outer container member shaped like a can, having a closed end and an enlarged open end where the outer container serves as one of the electrodes. The open end of the outer container is physically deformed against an insulation structure to provide a seal for the electrolytic cell within the enlarged open end. However, with very small electrolytic cells it is impractical, if not impossible, to deform the open end of a very small cylindrical electrode to provide a seal for the electrolytic cell. Consequently, the present invention is directed to an improved electrolytic cell that is simpler in construction than the prior art electrolytic cells and that is economical in construction.

SUMMARY OF THE INVENTION

In the present invention, the electrolytic cell comprises a first electrode and a second electrode. The first electrode is formed as a container having an open end, a closed end, and a wall. The wall of the container includes at least an inner surface of an active material, such as silver. A liquid electrolyte is contained within the container for providing conduction of the active material between the first electrode and the second electrode. A plug, having a hole therethrough is disposed within the container. The plug is inserted in the open end of the container and comes into contact with the liquid electrolyte and the wall of the container. At least a portion of the second electrode is inserted through the hole in the plug and extends therethrough and into the electrolyte. The second electrode includes an enlarged portion which limits the insertion of the second electrode through the hole in the plug. A sealant fills the open end of the container and surrounds the enlarged portion of the second electrode and mechanically bonds to at least the wall of the container and the second electrode for locking the second electrode in position and for preventing escape of any of the liquid electrolyte.

The objects, features, and advantages of the present invention will become more apparent with reference to the following description, taken in conjunction with the accompanying drawing.

DESCRIPTION OF THE PREFERRED EMBODIMENT

Referring now to the single FIGURE of the drawing, there is shown a cross-sectional view of an electrolytic cell of the present invention. The electrolytic cell includes a first electrode 30 and a second electrode 60.

The first electrode 30 is formed as a container 32. The container 32 has an open end 33, a closed end 34, and a wall 35. The container 32 is made of a metal including an electrochemically active material such as silver. For example, the container 32 may be made entirely of the active material or the wall 35 of the container 32 may include a layer of active material on the interior thereof. A lead 36 may have a head 38 at one end for providing a larger surface for the lead 36 to attach to the closed end 34 of the container 32. The lead 36 can be attached to the closed end 34 of the container 32 by a suitable welding process, such as by percussive arc welding.

Included within the container 32 is a liquid electrolytic solution 50. The electrolyte 50 operates to conduct the active material between the first electrode 30 and the second electrode 50 in response to an electrical current. The electrolyte 50 is of the type that will chemically react with the active material to form salt of the active material. For example, if the active material used is silver, the electrolyte 50 must be of the type to form a silver salt by the reaction of the electrolyte 50 with the active metal. For example, electrolyte 50 may be the type disclosed in U.S. Pat. No. 3,423,643, issued Jan. 21, 1969, in the name of Edmund A. Miller and assigned to the Bissett-Berman Corporation.

A plug 40 having an opening 42 therethrough is shown disposed within the container 32. The plug 40 is inserted in the open end 33 of the container 32 to a particular position within the wall 35. More particularly, the plug 40 is inserted within the wall 35 of the container 32 to a position where the plug 40 is in physical contact with the electrolyte 50. Positioning the plug 50 has the advantage that undesirable air pockets within the container 32 and in the electrolyte are eliminated. For example, when the plug is inserted the air can escape through the hole 42 of the plug 40.

THe plug 40 preferably has an outside dimension large enough with respect to the inside dimension of the wall 35 of the container 32 so that the plug 40 is held in place by friction and substantially prevents passage of the electrolyte 50 between the wall 35 of the container 32 and the plug 40. The plug 40 can be made of any suitable material that will not deteriorate when exposed to the electrolyte 50. For example, the plug 40 can be made of a suitable rubber or elastomer such as the material sold under the trade name of Viton.

The second electrode 60 includes a first end 68 disposed within the electrolyte 50 and a second enlarged end 63. A lead member 64 having a head portion 66 on one end thereof is welded to the enlarged end 63 of the second electrode 60. If percussive arc welding is used to form the weld joint 65, wherein the lead 64 and the anode 68 are driven together while supplying an electrical energy therebetween, the head 66 provides a larger surface area to ease alignment and welding of the lead 64 and the second enlarged end 63. It should be appreciated that the second enlarged end 63 may not be enlarged before welding the second electrode 60 to the lead member 64 but may be formed as a result of the welding. THe anode 68 includes an outer surface of an inert metal, such as gold. The anode 68 can be a solid piece of inert material such as a piece of a solid gold wire that has been cut to a predetermined length. The lead 64 may be made of a suitable metal for constructing leads such as a tin-plated copper lead. It should be noted that the second electrode 60 and the lead 64 may be constructed as one continuous piece of metal such as a piece of gold wire having an enlarged central portion corresponding to the enlarged end portion 63 and the lead 66 forming the weld joint 65. However, the cost of using a solid piece of gold would substantially increase the cost of the electrolytic cell.

The enlarged portion 63 provides a mechanical stop so that when the second electrode 60 is inserted in the hole of the plug 40, the second electrode may only be inserted until the enlarged portion 63 comes into physical contact with the plug 40. When assembling small devices it is considerably difficult to visually determine the amount of the second electrode 60 inserted in the hole of the plug 40. However, with the enlarged portion 63, an assembler can easily feel when the enlarged portion 63 comes into physical contact with the plug 40. Furthermore, the anode 68 can be precut to a particular length, and when inserted in the hole in the plug 40, a reproducible amount of the anode 68 extends into the electrolyte 50 to provide uniformity in construction.

A sealant 70 is shown filling the open end 33 of the container 32 and bonds to the wall 35 of the container 32, to the second electrode 60, and to the plug 40. The sealant 70 can be a suitable epoxy or similar adhesive that will bond to the particular metals and plastics used in the construction of the cell. The sealant 70 should have the characteristics such that the sealant 70 will not deteriorate when exposed to the electrolyte 50. Consequently, if any of the electrolyte 50 should penetrate between the plug 40 and the wall 35 to the sealant 70, the sealant 70 would not deteriorate. A deterioration of the sealant 70 might allow some of the electrolyte 50 to escape from the electrolytic cell and thereby degrade the performance of the electrolytic cell.

As shown in the drawing, the sealant 70 substantially surrounds the weld joint 65. Consequently, the sealant 70 also prevents the weld joint 65 and hence the second electrode 60 from being displaced from the assembled position when exposed to a pulling force. For example, if the lead 64 is pulled, the sealant 70 will hold the weld joint 65 substantially in position, which can in turn prevent the anode 68 from being removed or displaced from the electrolyte. Furthermore, the sealant 70 provides additional support to the weld joint 65 by surrounding the weld joint 65. Also, the sealant 70 provides an insulation between the container 32 and the second lead 68 so that if the lead 68 is bent toward the wall 35 of the container 32, the sealant 70 will prevent the lead 64 from coming into physical and electrical contact with the open end 33 of the container 32.

While the salient features of the present invention have been illustrated and described with respect to a particular embodiment, it should be readily apparent that modifications can be made within the spirit and scope of the invention.

What is claimed is:

1. An electrolytic cell, comprising:
a first electrode having a wall defining a tubular space, a closed end and an open end and with at least a portion of the inner surface of the wall of the first electrode including an electrochemical active material;
an insulating plug having at least one opening therethrough disposed within the open end of the first electrode and displaced along the wall to form a closed chamber defined by the closed end of the first electrode and the plug and an open chamber defined by the open end of the electrode and the plug;
a second electrode having a first end having at least an outer surface of an inert material and an enlarged end, the first end of the second electrode extending through the opening of the insulating plug with said enlarged end limiting the extension of the first end through the opening in the insulating plug;
an electrolyte disposed within the closed chamber for conducting the active material from one of said electrodes to the other in response to an electrical signal applied between the electrodes, and
an insulating sealant filling the open chamber and making a mechanical bond with the wall of first electrode, with the plug and with the enlarged portion of the second electrode for preventing the escape of electrolyte from the cell and for locking the second plate in position.

2. The electrolytic cell of claim 1 wherein the sealant maintains the bond when exposed to the electrolyte.

3. The electrolytic cell of claim 1 wherein the sealant is nondeteriorating upon contact with the electrolyte.

4. The electrolytic cell of claim 1 additionally including a lead member and a welded joint between the second electrode and the lead member.

5. The electrolytic cell of claim 4 wherein the welded joint is disposed within the sealant for preventing removal of the second end of the electrode from the electrolytic cell.

6. An electrolytic cell, comprising:
a container-electrode having an open end, a closed end, and a wall, a portion of the surface of said wall comprising an electrochemical active material;
an insulating plug having at least one opening therethrough disposed within the open end of the container and displaced along the wall of the container to form a closed member and an open chamber;
an electrode assembly having a first portion and a second portion, the first portion of the electrode assembly being inserted in the opening through the insulating plug and into the closed chamber and the second portion projecting through said open chamber;
an electrolyte disposed within the closed chamber in contact with the first portion of said electrode assembly for conducting active material from one to the other in response to an electrical potential applied therebetween, whereby active material may be conducted to the first portion of the electrode assembly in response to an electrical potential of a first polarity applied between the container-electrode and the electrode assembly and whereby active material may be conducted to the container-electrode in response to an electrical potential of a second polarity applied between the container electrode and the electrode assembly; and
an insulating sealant filling the open chamber and making a mechanical bond with the wall of the container-electrode and the electrode assembly for securing the electrode assembly in position and preventing loss of electrolyte from said closed chamber.

7. The electrolytic cell of claim 6 wherein the second portion of the electrode assembly includes a lead member and a weld joint connects the lead member to the end of the first portion of the electrode assembly, said weld joint providing a mechanical stop for the electrode assembly when the first portion of the electrode assembly is inserted in the opening through the insulating plug.

8. The electrolytic cell of claim 6 wherein the second end of the electrode assembly.